United States Patent [19]
Lekarski et al.

[11] 3,796,135
[45] Mar. 12, 1974

[54] PNEUMATIC CONTROL DEVICE WITH PROGRAMMED CHARACTERISTIC, PARTICULARLY FOR A VEHICLE BRAKING DEVICE

[75] Inventors: Simeon Lekarski, St. Cloud; Pierre Hardy; Leon Hardy, both of Paris, all of France

[73] Assignee: Jean Gachot, Enghien-les-Bains, France

[22] Filed: Jan. 4, 1971

[21] Appl. No.: 103,682

[30] Foreign Application Priority Data
Aug. 1, 1970 France .............................. 7000644

[52] U.S. Cl. ............................. 91/461, 137/625.66
[51] Int. Cl. ..................... F15b 11/08, F15b 13/042
[58] Field of Search ...... 137/625.66, 625.64, 625.6, 137/627.5; 91/457, 454, 461, 469, 304

[56] References Cited
UNITED STATES PATENTS

| | | |
|---|---|---|
| 2,858,840 | 11/1958 | Wright, Jr. ........................ 91/454 X |
| 2,911,005 | 11/1959 | Adelson ........................... 91/454 X |
| 2,999,513 | 9/1961 | Oetiker ......................... 137/627.5 X |
| 3,272,564 | 9/1966 | Romanini .................. 137/625.66 X |
| 3,277,923 | 10/1966 | Hogel............................. 137/627.5 |
| 3,536,089 | 10/1970 | Sarbach ..................... 137/627.5 X |
| 3,601,155 | 8/1971 | Brown............................ 137/625.66 |

*Primary Examiner*—Irwin C. Cohen

[57] ABSTRACT

A pneumatic control having programmed characteristic for use especially for a vehicle braking device comprising at least one pilot reducing valve connected to a source of compressed fluid supply, to the atmosphere and to a fluid outlet conduit terminating in a pneumatic control member. The reducing valve has members for controlling the passage of fluid that is operably connected with a programming device that is capable of being corrected by a device for applying different parameters.

3 Claims, 16 Drawing Figures

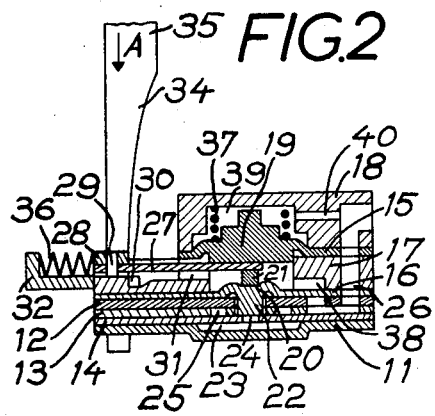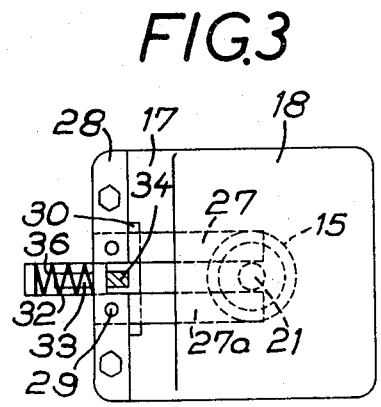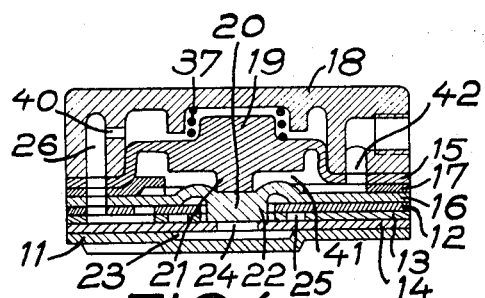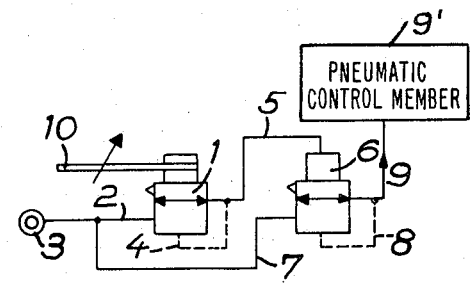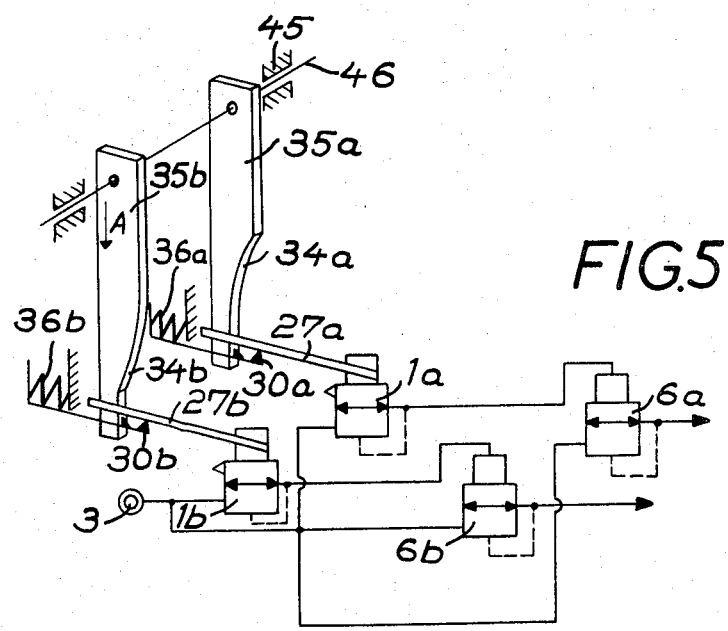

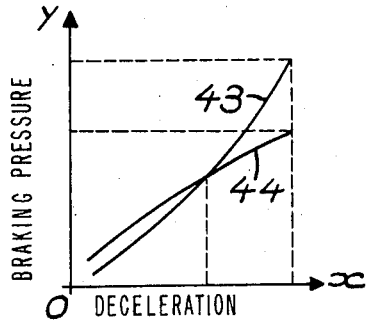
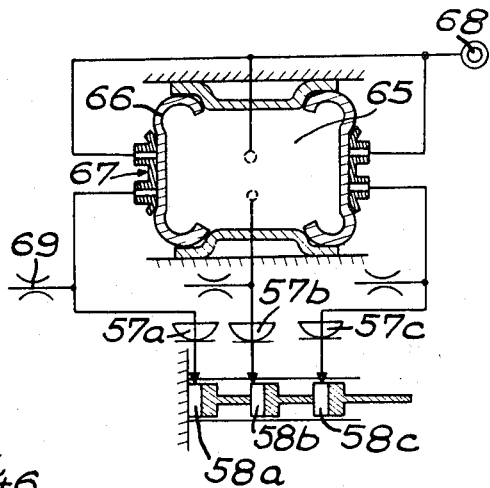
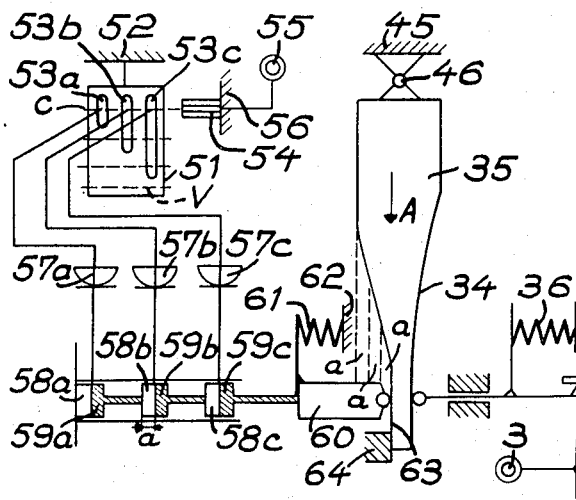
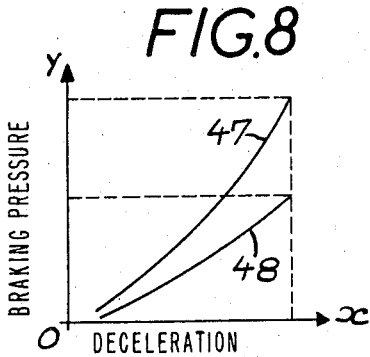
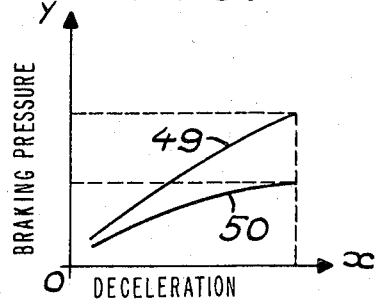

3,796,135

3,796,135

PNEUMATIC CONTROL DEVICE WITH PROGRAMMED CHARACTERISTIC, PARTICULARLY FOR A VEHICLE BRAKING DEVICE

The present invention relates to a pneumatic control device with programmed characteristic, particularly for a vehicle-braking device.

For pneumatically controlling different installations and particularly those which have the same characteristics as a braking device, a control device is used which comprises at least one pressure-reducing valve of a type having a large number of advantages over known pressure reducers.

In fact, the reducing valves of known type have a certain number of disadvantages, particularly concerning the difficulty in obtaining a reducing valve of reduced bulk which is highly accurate and has a high output.

Another difficulty resides in the fact that it is sought to reduce the cost of the reducing valve by simplifying its functional components and this results in insufficient output parameters.

Furthermore, the output characteristic of the known reducing valves has a non-modifyable working, this not permitting them to be adapted to the requirements of the different braking devices for vehicles for which they are intended.

In the field of braking, it is also desirable that a reducing valve be connected to each axle and adapted to the ratios of the braking stress, which must approximate to the best conditions possible.

The reducing valve according to the invention made according to this technique enables an apparatus to be obtained which is of extremely reduced bulk, of simplified production and of low cost price.

It is therefore possible to associate a pilot reducing valve acting as programmer to another reducing valve of similar design, but enabling a much higher output power to be had. By this means, the two reducing valves may be assembled on a common base in order to form an assembly of considerably smaller dimensions than those of the known reducing valves.

Although the reducing valves in the control device according to the invention are substantially flatter than the known reducing valves, their reaction surfaces are sufficiently large to supply an output characteristic whose precision is at least equal to that of the existing reducing valves, if not greater.

The control device according to the invention comprises a programming device constituted by plates cut out in order to present a determined section and permitting action on the operation of a pilot reducing valve, in order that it may fulfill the requirements of a control device, particularly a braking device. The programming device obtained by means of sectioned plates may receive means for correcting the characteristics according to the load of the vehicle, or means for reducing the braking stress, in the case of locking.

In accordance with the present invention, the control device comprises a pilot reducing valve connected respectively to a source of compressed fluid supply, to the atmosphere and to a fluid output conduit ending in a pneumatic control member, said reducing valve comprising members for controlling the passage of the fluid, the operation of which is connected with programming means whose characteristics are capable of being corrected by means for applying different parameters.

The invention will be described in greater detail with reference to the accompanying drawings, in which:

FIG. 1 is a schematic view showing a pneumatic control device according to the invention.

FIG. 2 is a sectional view of a pilot reducing valve.

FIG. 3 is a plan view of the same pilot reducing valve shown in FIG. 2.

FIG. 4 is a sectional view of a reducing valve controlled by a pneumatic signal.

FIG. 5 is a pneumatic control device applied to a system of braking the two axles of a vehicle.

FIG. 6 is a diagram representing the distribution of the braking torque on two axles of the same vehicle, according to a known load.

FIG. 7 is an embodiment of a control device with braking corrector as a function of the load of the vehicle.

FIG. 8 is a diagram representing the braking torque of the front axle, as a function of decelerations of the vehicle for different loads.

FIG. 9 is a diagram of the same functions for the rear axle.

FIG. 10 is an embodiment of a braking corrector in the case of a pneumatic vehicle suspension.

Figure 11:
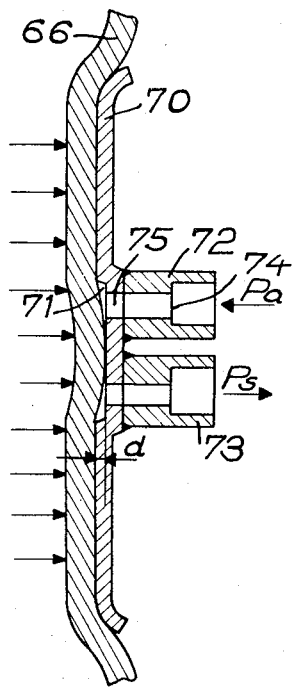
FIG. 11 is a sectional view, on a larger scale, of a barrage valve shown on the braking corrector of FIG. 10.

Referring now to the drawings, FIG. 1 shows an embodiment of a control device according to the invention, which comprises a pilot reducing valve 1 connected respectively by a conduit 2 to a source of pressurised fluid 3, by a conduit 4 for the reaction return and by a fluid output conduit 5 to a high outlet reducing valve 6 which is itself connected by a conduit 7 to the source of pressurised fluid 3, by a conduit 8 for the reaction return and finally by a fluid output conduit 9 to a pneumatic control member 9', particularly a pneumatic jack for controlling a braking member of a vehicle.

The pilot reducing valve 1 comprises a control member 10 connected to programming means making it possible to control the passage of the fluid coming from the source 3 and directed towards the high outlet reducing valve 6 which feeds the pneumatic control member and actuates this latter according to a determined program.

FIGS. 2 and 3 show an embodiment of a pilot reducing valve 1 which comprises a rigid stamped plate 11 and a rigid plate 12 between which are arranged two flat elements are elastic layers 13, 14; above the rigid layer 12 are arranged two diaphragms 15 and 16 which are held tightened on the plate by an intermediary member 17 and an end member 18.

The more rigid central parts 19 and 20 of the diaphragms 15 and 16 are extended by bosses 21, 22 which are used for transmitting the forces exerted on the different members of the reducing valve.

The rigid plate 11 has a stamped enclosure 23 which is closed by the elastic layer 14 which has a central aperture 24 normally obturated by the boss 22 of the diaphragm 16 which traverses the rigid plate 12 and the elastic layer 13. Furthermore, the elastic layer 13 has a conduit 25 in communication with the atmosphere.

In the members 17, 18, the membranes 15, 16, the rigid plate 12 and the elastic layer 13, there is provided a conduit 26 which terminates on one side beneath the diaphragm 16 and may be placed in communication with the enclosure 23.

Beneath the most rigid central part 19 of the diaphragm 15 is arranged one of the ends of two leaf springs 27, 27a, the other end of which is fixed between the body 16 and a stop 28 by means of a shaft 29, said springs 27, 27a being displaceable by means of a movable support member 30 which slides in the space 31 whilst abutting on the body 17; the movable support member 30 is unitary with a slide 32 having a slot 33 in which is engaged the sectioned end 34 of a plate 35 acting on the slide 32 in opposition to a spring 36. On the other hand, the diaphragm 15 is subjected in its upper central part to the action of a helical spring 37.

The pilot reducing valve operates in the following manner.

The compressed fluid coming from the source 3 is directed by the conduit 2 (FIG. 1) towards the enclosure 23 through an aperture (not shown in the drawing).

Initially, the springs 27, 27a and the movable support member are located in the position shown in FIGS. 2 and 3 for which no action is exerted on said springs. In this case, the pressurised fluid acts on the boss 22 of the diaphragm 16, repelling said latter in the direction of the boss 21 of the diaphragm 15, the pressure exerted by the compressed fluid on this latter being however lower than that of the helical spring 37, this resulting in the elastic layer 14 remaining in tight contact with the boss 22, acting as valve and preventing passage of the compressed fluid by the aperture 24.

Whilst the plate 35 is being displaced in the direction of arrow A, its engagement in the slot 33 causes the displacement of the movable support member 30 in the space 31, and positions the member 30 for the springs 27, 27a. When the member 30 draws near the central axis of the diaphragm 15, the stiffness of the springs 27, 27a increases, and consequently the force of the springs directed towards the diaphragm 15 to lift it also increases. If the displacement of the support member 30 is reversed, the effect on the diaphragm 15 is also reversed.

As the boss 21 is itself lifted, the pressurised fluid of the chamber 23 acts on the boss 22 of the diaphragm 16 in order to lift said latter. The elastic layer 14 also lifts until it reaches the elastic layer 13 against which it is stopped. By this means, a clearance is obtained between the rigid plate 12 and the boss 22, so that the compressed fluid passes between the rigid plate 12 and beneath the diaphragm 16, the cavity 38 provided in the body 17 enabling the diaphragm 16 to take the form of this cavity.

In this way, it is therefore possible to establish communication between the enclosure 23 and the conduit 26, by the aperture 24, the space between the plate 12 and the boss 22, and the passage beneath the diaphragm 16.

Simultaneously, the difference in pressure between the compressed fluid and the atmosphere holds the layer 14 against the layer 13, thus preventing the escape of the compressed fluid towards the aperture 25 and towards the atmosphere, the layers 13 and 14 acting as retaining valve.

The compressed fluid located in the output conduit 26 communicates with the reaction chamber 39 located above the diaphragm 15 by the calibrated conduit 40. The pressure of the fluid increasing in the chamber 39 actuates the diaphragm 15 in the direction of the diaphragm 16 until equilibrium is established between the action of the pressure of the fluid and that of the springs 27, 27a.

At the outlet aperture of the conduit 26, a constant pressure of the fluid is established.

In the case where the pressure of the fluid is maintained in the outlet conduit 26 and where the pressure of the springs 27, 27a on the central part 19 of the membrane 15 decreases, the reaction stress developed by the fluid pressure at the outlet on the diaphragm 15 becomes dominant and the movable part of the diaphragms moves towards the diaphragm 16 whose boss 22 abuts on the elastic layer 14 and breaks the seal between the layers 13 and 14, thus placing in communication the outlet conduit 26 and the atmopshere by conduit 25.

The escape to the atmosphere of the fluid located in the outlet conduit 26 is effected up to the moment when the equilibrium is again established between the reactions on the diaphragm 15 and the stresses of the springs 27, 27a.

This pilot reducing valve 1 with variable characteristics must have reduced fluid passages and it cannot be used alone in particular for actuating the cylinders of a braking device which necessitate a considerable output of fluid.

To this end, the control device according to the invention comprises in combination with the pilot reducing valve 1, a high outlet reducing valve 6 (FIGS. 1 and 4) which is made substantially in the same manner as the reducing valve 1.

The difference between these two valves resides in the fact that in the high outlet reducing valve (FIG. 4), the chamber 41 located between the diaphragms 15 and 16 is sealed and it is connected, by a conduit 42, to the conduit 5 through which the control pulses emitted by the pilot reducing valve 1 arrive.

Consequently, the members for controlling the programmation 30, 35 and 32 and the leaf springs 27, 27a which were present in the reducing valve 1 are eliminated.

The principle of operation of the high outlet reducing valve 6 is substantially the same as the pilot reducing valve 1.

The action of the leaf springs 27, 27a on the diaphragm 15 is replaced in the reducing valve 6 by the action of the pressurised fluid emitting a control signal and acting on the diaphragm 15. The surfaces of the central parts 19, 20, of the diaphragms are very different in order to ensure the necessary amplification of the reaction coming from the conduit 40 and to obtain a high precision of the reducing valve.

The control device described hereinabove may be applied more particularly to a vehicle braking device as shown in FIG. 5.

This braking device enables different braking pressures to be obtained on the two axles, said pressures varying according to two distinct laws which are as close as possible to ideal conditions.

This braking device comprises two control assemblies referenced $a$ and $b$, such as that shown in FIG. 1, the programming plates 35$a$, 35$b$ being articulated by means of an axis 46 to a control member 45 unitary with a brake pedal (not shown in the drawing) at the disposal of the driver of the vehicle.

The high outlet reducing valves 6$a$ and 6$b$ respectively ensure the feed of the brake cylinders of the front and rear axles of the vehicle.

On the diagram of FIG. 6, the abscissa $ox$ represents the ground adherence (deceleration) and the ordinate $oy$ the braking pressure (braking torque), the curves 43 and 44 corresponding respectively to the ideal distribution curves of the braking torque for the front and rear axles which are often used by vehicle constructors.

By means of relatively simple mathematical or graphic methods, it is possible to determine the form of the sections 34$a$, 34$b$ of the plates 35$a$, 35$b$ so that for a given position of the brake pedal unitary with the control member 45, a corresponding position of the plates 35$a$, 35$b$ is obtained which determine the fluid pressures at the outlet of the reducing valves 6$a$ 6$b$ which correspond to the pressures shown on curves 43, 44 of FIG. 6.

By this means, the braking control device of each type of vehicle may be adapted to the requirements thereof and enables a good distribution of the braking to be obtained by simply replacing the programming members, particularly the plates 35$a$, 35$b$.

Furthermore, it may be necessary to modify the braking force according to the load of the vehicle and FIGS. 8 and 9 show diagrams on which the abscissa $ox$ represents the deceleration and the ordinate $oy$ the braking pressures.

The curves 47 and 48 of FIG. 8 respectively represent the braking torque with loaded vehicle and with no load for the front axle and the curves 49 and 50 the braking torque for loaded and non-loaded rear axle.

This modification of the braking force is obtained by means of braking correctors. The control device shown in FIG. 7 comprises means enabling the characteristics of a pilot reducing valve to be modified in order to obtain a braking corrector.

In the case of a vehicle comprising a mechanical spring suspension (FIG. 7), the distance between the bodywork and the axles which varies according to the load, may be controlled by means including a punched card 51 with three columns 53$a$, 53$b$ 53$c$ fixed to the bodywork 52 and a pneumatic pickup 54 corresponding to each column 53$a$, 53$b$, 53$c$, is fixed to the axle envisaged 56 and fed by a source of pressurised fluid.

It is therefore possible to obtain a certain combination of signals corresponding to the different levels of the bodywork of the vehicle.

The level line V which corresponds to the vehicle which is not loaded, indicates that for this level, the card 51 has no perforation, whilst the line C corresponding to the loaded vehicle indicates that for this level the card 51 has three perforations 53$a$, 53$b$ and 53$c$.

These signals control three cells 57$a$, 57$b$, 57$c$, having the logic NO function which are connected to their outlet with the cylinders 58$a$, 58$b$, 58$c$ of jacks.

The jacks may be connected in series so that, the three jacks being under pressure on the outlet, a stroke is obtained which is equal to the sum of the strokes of pistons 59$a$, 59$b$, 59$c$.

This last piston 59$c$ controls the position of a stop member 60 against the action of a spring 61 in abutment on a fixed stop member 62.

The stop member 60 is capable of abutting against the face 63 of the plate 35 which is opposite the sectioned face 34.

The control device comprises, as in the preceding embodiments, a programming plate 35 for controlling a pilot reducing valve 1 associated with a high outlet reducing valve 6.

When the vehicle is loaded, the punched card 51 is in a low position corresponding to the level C and in this case the columns 53$a$, 53$b$, 53$c$ have three apertures on a line, enabling a low level signal to be obtained from pick-ups 54 and a high level signal at the outlet of the NO cells 57$a$, 57$b$, 57$c$.

The cylinders 58$a$, 58$b$, 58$c$ are fed with pressurised fluid and the stop member 60 is located in the position shown in FIG. 7. When the brake pedal is actuated, the plates 35 are driven in the direction of arrow A and by reason of its opposite sectioned faces 34 and 63, there result modifications of the elasticity of the flat springs 27, 27$a$ equal to the sum of the displacements defined by the sections of said faces, said sum varying according to the position of the plates in question.

Particularly for the position indicated in FIG. 7 of the stop member 60, the displacement is maximum and the pressures of the fluid at the outlet of the two pressure reducers 1 and 6 corresponds to the full load curves 47 and 49 of FIGS. 8, 9.

When the vehicle is not loaded, the pickups are located opposite the line V and the cylinders 58$a$ 58$b$, 58$c$ are not fed with fluid, the stop member 60 is then located in a leftward limiting position and is no longer in contact with the sectioned plate 35 which is then guided by the support member 64.

It is thus possible to obtain, by means of three cylinders having an identical stroke, different braking characteristics as a function of the load of the vehicle. Where the cylinders used have different strokes, it is possible to obtain, by their combination, ten different braking characteristics.

As the operational safety of the device is obtained by the use of NO cells, if for any reason one of the pickups determining the load did not operate correctly, its break-down is manifested by an absence of control towards the NO cell which continues to emit a signal to its outlet. If all the pick-ups did not operate at the same time, one would be in braking condition corresponding to the maximum load of the vehicle. Furthermore, channels and not circular apertures, are cut out in the punched card in order to be able to ensure the correct functioning of the device for all the intermediate loads.

In accordance with the invention, the punched card may be replaced by a plate presenting a surface with reliefs of variable shape, which controls pneumatic relays with pushes directly feeding the cylinders 58a, 58b, 58c.

The cylinders 58a, 58b, 58c having different strokes may be arranged in parallel and not in series.

According to another embodiment, it is possible to provide two punched cards, one of which being for the front axle, the other for the rear axle, said cards enabling the braking pressures to be corrected as a function of the dynamic distribution of the load, according to the different decelerations.

According to another embodiment, it is possible to make the stop member 60 operate directly by means of a mechanical device, converting the displacement of the chassis into a displacement of the stop member.

In the case of a pneumatic suspension device (FIGS. 10 and 11) comprising pneumatic cushions 65, it is possible to use the elastic layer 66 of the cushion for constituting barrage valves 67 which are connected on the one hand to a source of pressurised fluid 68 and on the other hand to a calibrated escape aperture 69 and to a cell with logic function 57a terminating in a control cylinder 58a as in the device shown in FIG. 7.

FIG. 11 shows in section a barrage valve 67 made on a pneumatic cushion 65 inflated to an inner pressure Pc which varies according to the load of the vehicle.

Around the cushion is disposed a metal belt 70 in which is made, by stamping, an enclosure 71 whose width is equal to $d$. There are welded to the belt 70 two bosses 72, 73 which have a conduit 74 for the inlet ($pa$) and the outlet of the fluid ($Ps$) in the enclosure 71, through apertures 75 provided in the wall 70 of the belt.

For a determined value of the width $d$ of the enclosure and of the inner pressure Pc of the pneumatic cushion, a predetermined opening pressure is obtained.

Figure 12A:
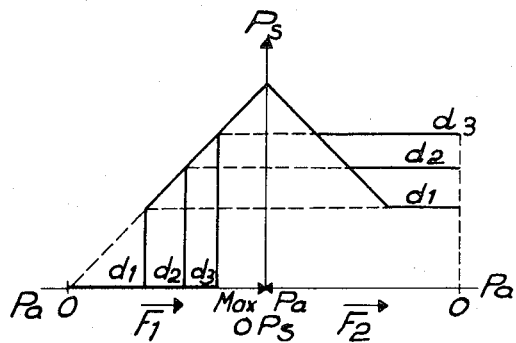
FIGS. 12a to 12c are diagrams representing the correspondence between the different operational pressures.

The correspondence between the opening pressure and the feed pressure for three distinct valves with different widths $d$ is shown in the diagram of FIG. 12a in which:

$d1 > d2 > d3$ and Pc = constant = Pc 3.

The arrow $F_1$ indicates the direction of the increase of Pa and arrow F2 indicates the direction of decrease of Pa. The highest opening pressure corresponds to the smallest distance $d3$.

Figure 12B:
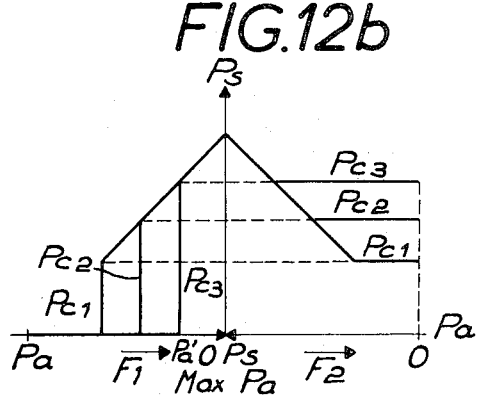

The diagram of FIG. 12b shows the influence of the pressure Pc of the cushion 65 on the opening pressure PS for a valve comprising an enclosure 71 of predetermined width $d$. In this case, Pc1 < Pc2 < Pc3 and the distance $d$ is equal to $d3$.

Figure 12C:
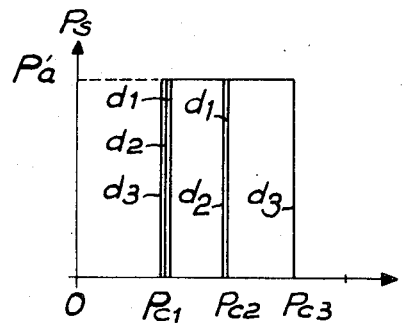

The diagram of FIG. 12c shows the operation of the three barrage valves 67 mounted on a suspension cushion which supports a variable load.

For the smallest pressure Pc in the cushion 65 (non-loaded vehicle), the three barrage valves 67 are open, the three NO cells 57a, 57b, 57c are closed and the pistons 59a, 59b 59c of the cylinders 58a, 58b, 58c are in withdrawn position.

With the increase in pressure Pc, the successive closures are obtained: of the valve 67 comprising the smallest width $d3$, followed by the valve of width $d2$ and lastly the valve of width $d1$. In this way, when the vehicle is fully loaded, all the valves are closed and the three output signals Ps escape through the calibrated apertures 69 so that the pistons 59a, 59b, 59c of the cylinders 58a, 58b, 58c are in outlet position.

In the case of a lack of suspension, it is possible to provide a conversion of the load on the axle into an electric signal by piezo-electrical pickup and the conversion of this electric signal into a pneumatic signal, in order to control the pistons 59a, 59b, 59c of the cylinders 58a, 58b, 58c or the direct use of the electric signal by an electro-mechanical device which directly controls the stop members 60.

Figure 13:
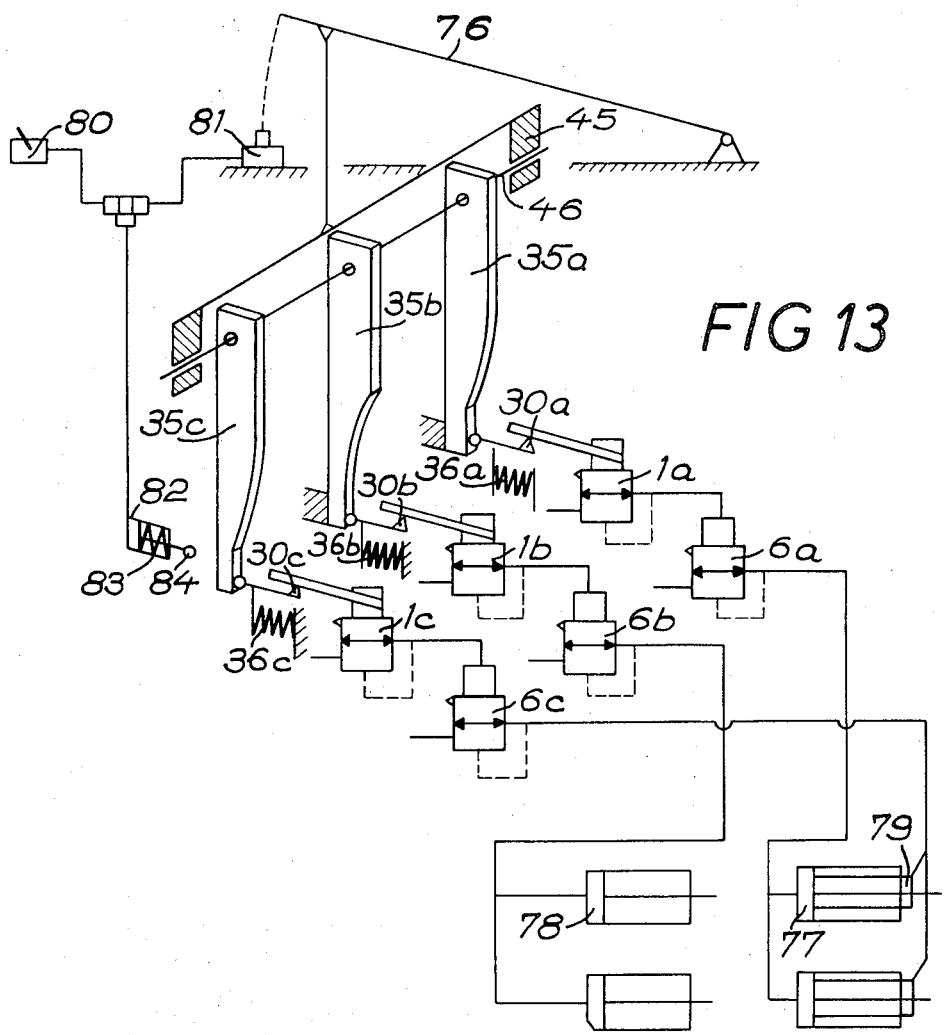
FIG. 13 is a schematic view of an embodiment of a braking device with a supplementary emergency control.

FIG. 13 shows a braking device which, in addition to controlling the braking of the front and rear axles, as shown in FIG. 5, comprising an emergency braking control.

As in the braking device described hereinabove, a pedal 76 is connected to a control member 45 on which are articulated by means of an axis 46 programming plates 35a, 35b, 35c which respectively control pilot reducing valves 1a, 1b, 1c and high outlet reducing valves 6a, 6b, 6c. The pressure reducer 6a feeds the cylinders 77 of the rear brakes, pressure reducer 6b feeds the cylinders 78 of the front brakes and pressure reducer 6c the cylinders 79 of the emergency brake.

In the case of a breakdown of the main braking device ($a, b$), the safety device may be put into operation manually by a switch 80 located on the dashboard, or a switch 81 actuated by the pedal 76 at the end of its stroke.

The switches 80 and 81 may be either electric or pneumatic, operating as relays with memory functions which change their state after each control. By this means, the operation of the safety device may be maintained up to the cancellation signal which occurs following a new operation of one of the switches.

The switches 80 and 81 are connected to a control member 82 of pneumatic or electromechanical type which acts against a spring 83 on a stop member 84, capable of abutting against the blade 35c in order to render said latter operative for the control of the pilot reducing valve 1c and of the reducing valve 6c which feeds the cylinder 79 of the emergency brake.

By this means, an emergency control is had with programmed braking characteristics and use is made of the emergency brake device only outside normal operation of the main braking device, thus limiting the risks of simultaneous wear of the two circuits.

Figure 14:
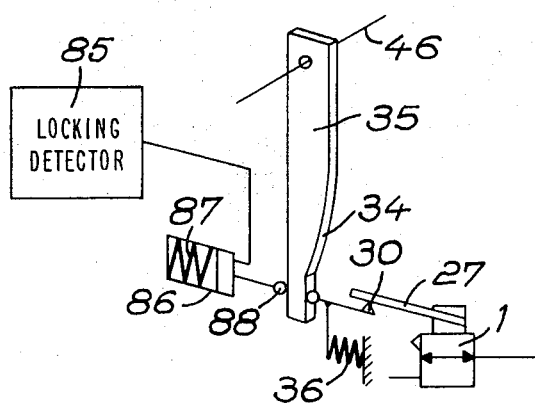
FIG. 14 is a schematic view of an embodiment of a braking control device with anti-locking device.

According to another embodiment shown in FIG. 14, the control device is provided with a locking detector 85 which is connected to a control member 86 acting against a spring 87 which maintains the stop member 88 in contact with the face of a programming plate 35 which is opposite the sectioned face 34.

When the signal coming from the locking detector is applied to the stop member 88, the plate 35 moves back whilst reducing the pressure of the fluid at the outlet of the pilot pressure reducer and by means of the high outlet pressure reducer, also reduces the pressure in the brake cylinders.

What we claim is:

1. A pneumatic control device with programmed characteristics, particularly for a vehicle braking device, comprising a pneumatic control member, at least one pilot reducing valve consisting of a stacking of first and second rigid plates and first and second layers of elastic material, said first of said rigid plates having an enclosure delimited by said first elastic layer which is in contact with said second elastic layer, said second elastic layer having an aperture in communication with the atmosphere and abutting against said second rigid plate, a source of compressed fluid, means connecting the enclosure to said source of compressed fluid, a first diaphragm disposed to overlie said second rigid plate and having a boss thereon, said first elastic layer having a central aperture which is normally obturated by said boss of said first diaphragm, a second diaphragm having a boss thereon and disposed above said first diaphragm, a fluid outlet conduit in said pilot reducing valve, the central aperture in said first elastic layer being capable of connection to said fluid outlet conduit by a space delimited between said second rigid plate and said first diaphragm, when this later is lifted under the action of said boss of said second diaphragm, means defining a chamber above said second diaphragm and being in communication with said fluid outlet conduit, a helical spring disposed in said chamber, said second diaphragm being normally maintained in contact with said diaphragm by the action of said helical spring, two leaf springs having first ends fixed to the casing of said pilot reducing valve and which, at their opposite ends, are in abutment with said second diaphragm, a spring loaded movable member, having an aperture therein, associated with said leaf springs and adapted to displace said leaf springs during movement thereof, the movement of said movable member being controlled by programming means, a high outlet reducing valve having inlet and outlet sections, the inlet section of said high outlet reducing valve being connected to said fluid outlet conduit of said pilot reducing valve and to the source of compressed fluid and said outlet section being connected to said pneumatic control member.

2. A control device of claim 1, wherein said first and second diaphragms have different surfaces superposed for controlling said first and second elastic layers.

3. The control device of claim 1, wherein said programming means comprises a control member, a sectional plate pivotably mounted at one of its ends on said control member, the other end of said control member having a section whose shape determines the operational program of said pilot reducing valve, said other end engaging in said aperture of said sliding control member, said movable member acting when urged by said other end of said sectional plate, on said leaf springs which in turn act by flexing on said boss of said second diaphragm of said pilot reducing valve.

* * * * *